US00RE37689E

(19) United States
(12) Reissued Patent
Stewart et al.

(10) Patent Number: US RE37,689 E
(45) Date of Reissued Patent: May 7, 2002

(54) LOW ENERGY FUSE AND METHOD OF MANUFACTURE

(75) Inventors: Ronald F. Stewart, Navan; David J. Welburn, Lachute; David M. Welsh, Victoria; Robert C. Greenhorn, L'Orignal, all of (CA)

(73) Assignee: Orica Explosives Technology Pty. Ltd., Melbourne (AU)

(21) Appl. No.: 09/064,535

(22) Filed: Apr. 22, 1998

Related U.S. Patent Documents

Reissue of:
(64) Patent No.: 5,509,355
Issued: Apr. 23, 1996
Appl. No.: 07/932,089
Filed: Aug. 19, 1992

U.S. Applications:

(62) Division of application No. 07/581,411, filed on Sep. 12, 1990, now abandoned, which is a continuation of application No. 07/306,013, filed on Feb. 3, 1989, now abandoned.

(30) Foreign Application Priority Data

Feb. 3, 1988 (GB) ..... 8802329

(51) Int. Cl.[7] ..... C06C 5/04
(52) U.S. Cl. ..... 102/275.8; 102/275.1; 102/275.11
(58) Field of Search ..... 102/275.1, 275.3, 102/275.5, 275.8, 275.9, 275.11, 275.12

(56) References Cited

U.S. PATENT DOCUMENTS

| | | | | |
|---|---|---|---|---|
| 2,891,475 A | * | 6/1959 | Dolan et al. | 102/275.8 |
| 2,909,418 A | | 10/1959 | Pearsall | |
| 2,974,596 A | | 3/1961 | Allen | |
| 2,993,236 A | * | 7/1961 | Brimley et al. | 86/1.1 |
| 3,311,056 A | * | 3/1967 | Noddin | 102/275.8 |
| 3,590,739 A | * | 7/1971 | Perrson | 102/275.5 |
| 3,698,280 A | * | 10/1972 | Welsh | 102/275.1 |
| 3,867,884 A | * | 2/1975 | Langrish et al. | 102/275.5 |

(List continued on next page.)

FOREIGN PATENT DOCUMENTS

| | | | |
|---|---|---|---|
| CA | 1200718 | | 2/1986 |
| FI | 864170 | | 4/1988 |
| GB | 1378669 | * | 12/1974 |
| GB | 2027176 | * | 2/1980 |
| GB | 1566107 | * | 4/1980 |
| WO | 8703954 | * | 7/1987 |

OTHER PUBLICATIONS

Kirk et al., *Kirk–Othmer Concise Encyclopedia of Chemical Technology,* John Wiley & Sons, New York, 1985, pp. 814–815.

Mark, et al., "Rheooptical Properties", Encyclopedia of Polymer Science and Engineering, 1988, 14:542, 564–576.

Schwarz, O., *Polymer Materials Handbook,* translated by Ebeling et al., Plastics Industry Training Board, South Africa, 1995, pp. 57–61.

Ulrich, H., *Introduction to Industrial Polymers,* Hanser Publishers, Munich, Germany, 1982, pp. 48–49.

English language abstract for Finnish Patent No. 864,170.

Patent Office Board of Appeals decision "Ex parte Copenhaver", 109 USPQ, pp. 118–119, Mar. 21, 1955.*

*Primary Examiner*—Stephen M. Johnson
(74) *Attorney, Agent, or Firm*—Maurice M. Klee

(57) ABSTRACT

A low energy fuse in extruded as a single ply primary tube 1 from a plastic resin blend with particulate energetic material 2 being internally distributed in a manner known per se, said resin blend comprising a major amount of an orientable polymer, for example, linear low density polyethylene to provide structural integrity and a minor amount of a modifier to impart enhanced particle retentive properties to the tube and preferably also containing a polymer or copolymer to impart melt strength and aid in tube extrusion.

37 Claims, 2 Drawing Sheets

U.S. PATENT DOCUMENTS 4,232,606 A * 11/1980 Yunan ..... 102/275.8
4,244,900 A 1/1981 Heider
4,290,366 A * 9/1981 Janoski ..... 102/202.3
4,316,415 A 2/1982 Baker
4,328,753 A * 5/1982 Kristensen et al. ..... 102/275.5
4,369,688 A * 1/1983 Yunan ..... 102/275.8
4,493,261 A * 1/1985 Simon et al. ..... 102/331
4,607,573 A * 8/1986 Thureson et al. ..... 102/275.5
4,660,474 A * 4/1987 Dias Des Santos ..... 102/275.8
4,699,059 A * 10/1987 Kelly et al. ..... 102/215.7
4,756,250 A * 7/1988 Dias Des Santos ..... 102/275.1
4,757,764 A * 7/1988 Thureson et al. ..... 102/275.8
4,817,673 A * 4/1989 Zoghby et al. ..... 102/275.1
4,838,165 A 6/1989 Gladden et al.
5,010,821 A * 4/1991 Blain ..... 102/275.8
5,629,493 A 5/1997 Andersson et al.

* cited by examiner

LOW ENERGY FUSE AND METHOD OF MANUFACTURE

Matter enclosed in heavy brackets [ ] appears in the original patent but forms no part of this reissue specification; matter printed in italics indicates the additions made by reissue.

This is a division of application No. 07/581,411, filed Sep. 12, 1990 now abandoned which is a continuation of Appln. No. 07/306,013, filed Feb. 3, 1989 now abandoned.

The present invention relates to an improved, low energy fuse for use in commercial blasting, improved materials useful in its manufacture and to a method for producing such a fuse.

The use of non-electric explosives initiation systems is now well known in the blasting art. Generally, these systems comprise the use of one or more lengths of detonating fuse cord each having attached at one end thereof an instantaneous or delay blasting cap. When the opposite end of the cord is initiated by means of an explosive initiator, such as a cap or priming trunk line fuse cord, the detonating fuse is detonated and an explosive wave is transmitted along its length at high velocity to set off the attached blasting cap. The use of such a system is generally chosen where there may be hazards involved in using an electric initiation system and electric blasting caps.

In the past, many improvements have been made in the quality and reliability of non-electric initiation systems and in detonating fuse cord. An early but significant development was disclosed in our British patent No 808 087 (equals U.S. Pat. No. 2,993,236). This provided a solution to the problem of how to safely incorporate an explosive core in a thermoplastic tubular sheath during extrusion. The technique disclosed therein can be widely applied to production of tubular products for use in initiation systems. One such product is shown in British Patent No. 1 238 503 (equals U.S. Pat. No. 3,590,739; CA 878 056) which discloses a detonating fuse which comprises a tube having only a thin layer of a reactive substance coated on the inner area thereof rather than a core. Such a fuse is marketed under the registered trade mark "NONEL". Commonly, this type of fuse has come to be known as a shock wave conductor and will be referred to as such hereinafter.

The production of shock wave conductors of small diameter has been restricted to use of a limited number of polymers due to the principal properties sought for the product. The product development trend in the art to meet such problems has been to provide laminated plastics tubes comprising an inner and outer layer of differing plastics to satisfy requirements of reactive substance adhesion and mechanical strength respectively. A shock wave conductor in the form of a two-ply laminated tube, the outer ply of which provides reinforcement and resists mechanical damage, is disclosed in GB 2 027 176 (U.S. Pat. No. 4,328,753; CA 1 149 229). Likewise in U.S. Pat. No. 4,607,573, a method is described for the manufacture of a two-ply or multiply shock tube wherein the outer covering is applied only after the inner tube has been stretched to provide the desired core load per unit length. Further examples of such over coated tubes are disclosed in U.S. Pat. No. 4,757,764 which proposes use of the tubes of the type disclosed in the above-mentioned U.S. Pat. No. 4,607,573 with non-self-explosive reactive material within the tube. Other disclosures of the use of non-self-explosive reactive material are to be found in Brazilian Patent No. PI 8104552, CA 878 056, GB 2 152 643 and U.S. Pat. Nos. 4 660 474 and 4 756 250.

While the invention of the shock wave conductor has been an important contribution to the art of blasting, the known shock wave conductors are not without disadvantages. Since the reactive substance within the tube only comprises a thin surface coating which adheres to, but is not bound to the tube, then only certain special plastics have in practice been found suitable to provide the necessary adhesion. Such special plastics tend to be both expensive and to lack mechanical strength. When protected by an outer layer of material, as disclosed in U.S. Pat. Nos. 4,328,753 and 4,607,573, the mechanical properties are improved.

SUMMARY OF THE INVENTION

A need has arisen, therefore, for a shock wave conductor which retains all the explosive properties of the tubes currently in use and which is also possessed of great mechanical and tensile strength but at low production cost.

According to the present invention, a low energy shock wave conductor is provided which comprises an extruded single-wall, dimensionally stable plastic tube having an inner surface coated with a particulate reactive energetic material, the plastic of the said tube comprising a substantially homogeneous blend of a major amount of a draw orientable polymer resin lacking adequate reactive material-retaining properties, and a minor amount of a modifier which is a miscible or compatible material which imparts an enhanced reactive material-retaining capability to the said extruded plastic tube.

Most favourable results are achieved in most instances when the polymer is substantially orientated linearly and this is best achieved by cold drawing the tube after melt consolidation. As used herein the term "cold drawing" means irreversible extension with a localised draw point of the extruded tube at any stage after the polymer has left the extruder and cooled sufficiently to consolidate a permanent tubular structure but remains plastic or sufficiently so to permit stretching under applied stress to thereby orientate the crystallites in the direction of tube length. Thus cold drawing may be carried out at any stage after the tube has taken shape after extrusion and has begun to cool from its extrusion temperature. Therefore it should be noted that the temperature of "cold drawing" lies suitably in the range of from about ambient room temperature to about 180° C. or higher depending on the polymer(s) chosen and it will be recognised that the temperature profile of the cold drawing stage(s) need not be uniform so that the post-extrusion temperature treatment of the tube may be variable. Additionally, intermediate or terminal relaxation stages may be employed, as are well known in the synthetic fibre art, to "stress relieve" the cold drawn tube and thereby impart improved dimensional stability to the tube. It is envisaged that normally artificial cooling of the extruded tube will be applied such as forced air and/or water cooling to control the temperature during post extrusion treatment. The resulting tube is safe to handle and is easily reeled for storage or transport. Of course the finished tube may be treated externally with agents to improve resistance to water and oil, especially diesel, permeability. Ordinarily a thin film or coating will suffice. Alternatively, the polymer blend may include a further resin to improve oil resistance. The tube can be overcoated with another layer of polymer as in the prior art tubes but there is no perceived advantage in doing so.

Tests, including microscopic examination, carried out on the improved tubes made so far in accordance with the invention indicate that the draw-orientable polymer resin is in the form of a continuous matrix whilst said compatible material is mostly present within the matrix as discrete noncontiguous particles, sized about 0.5 $\mu$, or fibrils a few microns in length, with aspect ratios typically of from about 6 up to about 10 oriented along the tube axis. The structural state of said miscible material is less certain because inherently there are no clear phase boundaries to be highlighted by electron microscopy. However we have noted that those miscible polymeric materials that impart good particle adhesion properties at the inner tube surface appear to be present to a substantial extent as indistinctly segregated zones of more concentrated material. Thus electron microscopy (viewing regions up to 20$\mu$ across) reveals arbitrary random microstructure in the plastic matrix consistent with such zoning. It has further been observed that in many instances the miscible or compatible material is, following melt extrusion, distributed such that it has a greater concentration at the inner surface of the tube than in the body of the matrix which provides optimum exposure to interaction with the reactive material and favorable performance in the resulting shock wave conductor. The distribution of the miscible or compatible material will vary depending on the physical and chemical properties of the selected material.

The polymer tube components may be pro-blended in a suitable mixer prior to supply to the melt extrusion equipment to ensure proper mixing of material with the matrix polymer. The observed surface enrichment upon melt extrusion is a surprising effect and provides a surface presence of the desired powder adherent material substantially larger than the population of components in the tube material would imply. This phenomenon is believed to be achievable by a number of mechanisms, or a helpful combination of such mechanisms, depending on the particular polymer matrix and powder adherent materials present. Presently favoured explanations are first preferential wetting or coating of the extrusion die surfaces by the dispersed material in the molten polymer matrix, and second migration of material under shear gradients in the extrusion head to the die head surface, i.e. rheological causes. The evidence of inner surface enrichment both in the as-extruded tube and that following cold drawing is scientifically demonstrable by use of well known physical techniques such as ESCA.

DETAILED DESCRIPTION OF INVENTION

The miscible or compatible material is preferably a miscible or compatible polymer or copolymer resin or a lower molecular weight material of like properties capable of improving reactive material-retaining properties of the matrix polymer by one or more of the following mechanisms; (i) chemical interaction such as ionic or hydrogen bonding; (ii) physical interaction such as polar attraction, tack or surface-wetting and (iii) electrostatic interaction with the selected reactive material. In fact virtually any material which can be successfully introduced to the bulk matrix-forming polymer and survive the extrusion process without degenerating or disrupting the formation of the tube can be used provided it has the capability to impart the desired improvement in reactive material-retaining property to the matrix polymer. Suitable materials can be recognised by their compatibility with the selected bulk resin and by having pendant or free functional groups which will interact with the chosen reactive material by e.g. polar attraction, hydrogen bonding, ionic attraction without necessarily forming an ionic bond. Alternatively the molecular structure is such that interaction is by physical attributes such as tack, high surface energy or surface conditions e.g. roughness which could be modified by inclusion of ultrafine fillers such as silica at levels of perhaps 0.5–1.0%.

The bulk polymer matrix of which the tube is mainly composed broadly comprises olefinic polymers, including ethylene/alpha-olefin copolymers where the olefin monomer may have from 4 to 16 carbon atoms such as 1-butene, 1-hexene, 1-octene, 4-methyl-1-pentene etc. These typically have a melt flow index of from 0.1 to 2 and a density of from 900 to 950 kg.m$^{-3}$. In general suitable matrix polymers will be fibre forming polymers. Advantages of these polymers are their ease of processing in extrusion equipment, structural strength and generally lower cost that current shock tube components.

The plastic preferably also comprises a minor amount of a polymer or copolymer resin or cross-linking agent which is miscible in the said matrix polymer resin and which imparts melt strength and aids in tube extrusion. Such a material may be an ethylene/acrylic acid ester copolymer or a copolymer of ethylene and vinyl acetate. The acrylic esters are preferably lower alkyl esters such as methyl or butyl acrylates.

Thus a suitable tube comprises a blend of 60 to 97% by weight of a polyolefin resin, e.g. linear low density polyethylene, (optionally including from 5 to 45% weight of a second resin which is a polyolefin-miscible or compatible polymer, copolymer or cross-linking agent which imparts melt strength to the blend and aids in tube extrusion) and from 2 to 25%, preferably up to 10%, by weight of a third polyolefin-miscible or compatible resin which is a surface property modifying polymer or copolymer such as an ethylene/acrylic acid or methylacrylic acid copolymer which may be wholly or partially neutralized e.g. an ionomer such as Surlyn 1855 (Trade Mark for a Du Pont product).

A linear low density polyethylene which may constitute up to about 97% of the polymer blend and which is used in a preferred embodiment of the tube of the invention desirably has a melt flow index (MFI) of around 1.0. The polyethylene-miscible or compatible resin which imparts melt strength to the polymer blend can advantageously be, for example, ethylene/vinyl acetate copolymer or a low density polyethylene having a melt index of 3 or less. The polyethylene-miscible or compatible powder-retention enhancing resin may be any acidic or ionomeric-based co-polymer such as, for example, PRIMACOR, an ethylene-acrylic acid copolymer, sold by Dow Chemical Company.

The method of the invention comprises the steps of extruding a melt of the blended constituents of the plastic tube through a wide annular die in the form of a thick walled tube while distributing particulate reactive energetic material in a core load per unit length on the inner wall of said thick walled tube and elongating the said thick walled tube to form a localized drawing point by cold drawing, to increase the tube tensile strength, to reduce the said wall thickness and to reduce the core load per unit length of the said reactive material. The manner of extruding the thick walled tube whilst introducing the core load of reactive material is similar to that disclosed in GB 808 087 (U.S. Pat. No. 2,993,236) and is widely understood by those in this art. The sizes for shock tube are virtually standardized throughout the art at approximately 3 mm O.D. and 1 mm I.D. by the need for compatibility with existing detonators etc. Thus it will be apparent to those skilled in the art that sizing dies, where required, amount of melt drawing and cold drawing will be selected to provide an equivalent or different sized product. It may be suitable to start from extrusion of a primary tube of about 6 to 10 mm O.D. and about 3 mm I.D. Significant drawing below tube consolidation temperatures may be most appropriate. However in view of the diversity of compositions now discovered to be useful for producing such tubes it is not considered that definite ranges can be specified for drawing. However a natural draw ratio of at least 4:1, weight for weight of equal lengths of undrawn against drawn tube, may be most favorable which is perhaps equivalent to a mechanical draw ratio of about 5 to 8:1 Therefore, due consideration must be had to the type of matrix polymer chosen and any necessary minor operating adjustments ascertained by brief preliminary trial or experimentation. Guidelines for same may be determined from the non-limitative Examples hereinafter given.

The plastic tube shock wave conductor is preferably manufactured in such a manner as to provide a tensile strength of up to 170 newtons per square millimetre. An effective minimum coreload for high velocity shock tubes would be about 15 $mg.m^{-1}$ but loadings of reactive material of up to 20 $mg.m^{-1}$ are possible, or even higher as indicated in the above-mentioned specifications e.g. 25 to 60 mg per linear meter as indicated in U.S. Pat. No. 4,757,764. Tube dimensions are a matter of choice and would be affected by the required internal diameter and the need to obtain a self-supporting tube but normally these would be from 2.5 to 3.3 mm O.D. and about 1.3 mm I.D.

Suitable materials for use as the draw orientable matrix polymer include linear polyethylenes such as those currently commercially available under the Trade Marks "Aecithene", particularly LF 3020, LF 3081 and LF 3100; "Dowellex", especially 2045-A, 2049 and 2075; Du Pont 12J1; Esso 3121.73; Idemitsu polyethylene-L 0134H; Mitsubishi polyethylene-LL H20E, F30F and F30H; Mitsui "Ultzex" 2020L, 3010F and 3021F; Nippon NUCG-5651 and Union Carbide DFDA-7540, which are all believed to be essentially LLDPE's, but equally MDPE, HDPE, ULDPE and LDPE can be used to form plastic tubes in a satisfactory manner. Blends of these polyolefins are also considered useful, especially LLDPE with HDPE due to their close compatibility which is believed to arise from cocrystallisation. Ethylene/propylene copolymers such as EXXELOR™ PE 808 (Exxon Chemicals Ltd.) and polypropylenes such as PROPATHENE™ (ICI) are also useful for the present purpose. Likewise, copolymers of these polyolefins with substituted olefins is possible.

Due to variations in commercially available bulk polymers some initial experimentation and minor variation of the extrusion process may be required but such is believed to be within the ordinary skill of those in the art. Apart from the above olefinic polymers which are favored in terms of availability, cost, processability and physical properties, when extruded to form a shock tube, other draw-orientable melt-extrudable polymers of sufficient toughness and possessing adequate water and oil resistance may be used e.g. polyesters such a polyethylene/butyleneterephthalate (PBT) of nylons may also be used as a basis for the structural polymer matrix of the tube with similar results. Kodar™ is a suitable polyester obtainable from Eastman Chemicals. The diversity of polymers available in the plastics extrusion-moulding field and synthetic fibre field is now so vast that it is impossible to test them all but the expertise available in those fields will permit an informed exploration of other polymers should that be desired.

The polymer that provides the bulk matrix of the tube is simply required to provide a tough tube of the desired dimensions and physical properties and to be an adequate carrier for the incorporated material that serves to impart powder adherent/retentive properties to the inner tube surface. It needs, of course, to be melt extrudable in a manner allowing effective powder introduction and therefore to possess, or be given, adequate melt strength. Many of the preferred bulk polymers, e.g. LLDPEs, are melt-thinning under shear and therefore require either highly skilled extrusion expertise or, if a more forgiving polymer melt is desired, a sufficient but small proportion of melt blended miscible melt strength additive as described further below.

The basic and surprising discovery from which the present invention is derived is that for a practical shock wave conductor tube a bulk powder adherent homopolymer is not needed contrary to the long standing belief and practice of the art. A blend in which there is separation of function can work as well or better and be economically advantageous.

The particulate reactive material required for sustaining a shock wave within the tube requires the surface presence of an additive which according to the present invention may be in the form of another polymer, or a lower molecular weight material, which is sufficiently miscible or compatible as to be incorporated in the bulk polymer matrix to provide an extruded tube exhibiting the desired retentive properties. The additive must not be excessively binding nor exhibit aggressive tack or rely solely on transient electrostatic properties since the reactive material would then be incapable of propagating the shock wave either by being permanently attached to the tube surface or through migration from the surface over a period of storage. Thus we have found that selected materials should be added to the matrix polymer prior to extrusion to provide an extrudable blend capable of being drawn to form a satisfactory tube for use as a shock wave conductor. These are characterized by having pendant or free functional or polar groups e.g. carboxyl, anhydride, hydroxyl, halogen, cyano, amido, sulphonate etc., by having an inherent adherent property or by being of relatively small molecular size. Such materials can be selected from ethylene/acrylic acid (EAA) copolymers, ethylene/methacrylic acid (EMA) copolymers, polyisobutylenes (PIB), polybutadienes (PBD), polyethylene waxes (PE Wax), ionomers, polyethylene glycols (PEG), polypropylene glycols (PPG), ethylene vinyl alcohol resins (EVAL), buryl rubber, Rosin, maleinised polypropylene, polyacrylamide or polyacryl-amide oxime resins, polyethylene imine, sulphone or phosphonate resins. Preferably the additive is an ethylene acrylic acid copolymer (EAA) or methacrylic acid copolymer (EMA), or an ionomer. Polymers suitable for this purpose include those commercially available under the Trade Marks "Primacor" (EAA), e.g. 1430, "Surlyn" 1855 (believed to be wholly or partially neutralized polymers of methyl acrylic acid and ethylene monomer) or 8940 (Na ionomer), "Nucrel" (EMA) 403 or 410, Hyvis 30 (PIB, BP Chemicals), Lithene N4 6000 (PBD, Doverstrand Ltd), Soarnol D (EVAL resin, British Trades & Shippers), Portugese WW Gum Rosin from Mead King Robinson Co Ltd, PEG 4000 (Lanster Chemicals) and lower molecular weight materials such as PE wax (AC 617A NE 3569, Allied Chemicals) are also effective.

The terms "miscible" and more especially "compatible" should not be understood in any narrow sense of being free of all tendency (in The absence of other forces) to separate or segregate. Thus ionomers such as those sold under the Trade Mark "Surlyn" are not considered miscible with LLDPEs, nor are they promoted as being compatible with LLDPEs. However we have shown that under the high stress mixing and shearing forces experienced in a screw extruder they can be finely and homogeneously dispersed to levels of say 10% w/w and any inherent tendency to segregate or for droplets to coalesce into large globules does not adversely manifest itself in the short duration of extrusion prior to consolidation of the tube.

The polyethylene-miscible or compatible resin which imparts melt strength to the polymer blend can be, for example, ethylene/vinyl acetate copolymer such as CIL 605-V or ethylene/methyl acrylate or ethylene/butyl acrylate (EMA or EBA esters) or a low density polyethylene having a melt index of 3 or less. Lupolen 2910 M is a suitable EBA ester obtainable from BASF (UK) Ltd.

Of course these polymers may include typical additives such as flame retardants antioxidants fillers, slip and anti-blocking agents, coupling agents, U.V. stabilizers, thickeners and pigments as required.

BRIEF DESCRIPTION OF THE DRAWINGS

A better understanding of the details of the invention will be obtained from the following description and the accompanying drawings in which:

Referring to FIG. 1, a cross-section of the shock wave conductor of the invention is shown wherein 1 is the tubing wall which comprises one of the heretofore described plastic blends and 2 is a thinly distributed deposit of reactive or energetic material.

Referring to FIG. 2, the steps involved in the method of manufacture of The shock wave conductor of FIG. 1 are illustrated. Plastic resin storage hoppers P1, P2 and P3 contain, respectively, particulate polyolefin resin, optional particulate resin which imparts melt strength and particulate resin which enhances powder retention. The resins from P1, P2 and P3 are proportioned into resin blender 10 and the blended resin in transferred to extrusion apparatus 11. Extrusion apparatus 11 produces a continuous, thick-walled primary tube having an initial inner and outer diameter greater than that desired in the final tube product. As the thick-walled tube is produced, an energetic reactive material, for example, a powdered mixture of HMX and aluminium from reservoir 12, is distributed by known means on the inner surface of the tube at a core load of about 2–3 times that of the desired final tube product. The extruded thick-walled, energetic material-containing tube is then directed, as melt drawdown takes place, to a cooled, size-determining die 13 from which it emerges as a reduced diameter tube. After The drawdown size reduction, the tube is passed through a spray cooler 15 and, then, to an elongation/stretching station 16. Stretching station 16 preferably comprises a pair of capstans, the downstream, fast-moving capstan rotating 5 to 6 times more rapidly than the upstream slow-moving capstan in order to provide a corresponding elongation of the tube, and to eliminate bumpy areas and increase tensile strength. Heat from heating unit 14 may optionally be required. After stretching at station 16, optional cooling is provided at cooling unit 17 and, if desired, optional stress relief (not shown) may be given and the final product is collected at station 18.

Figure 1:
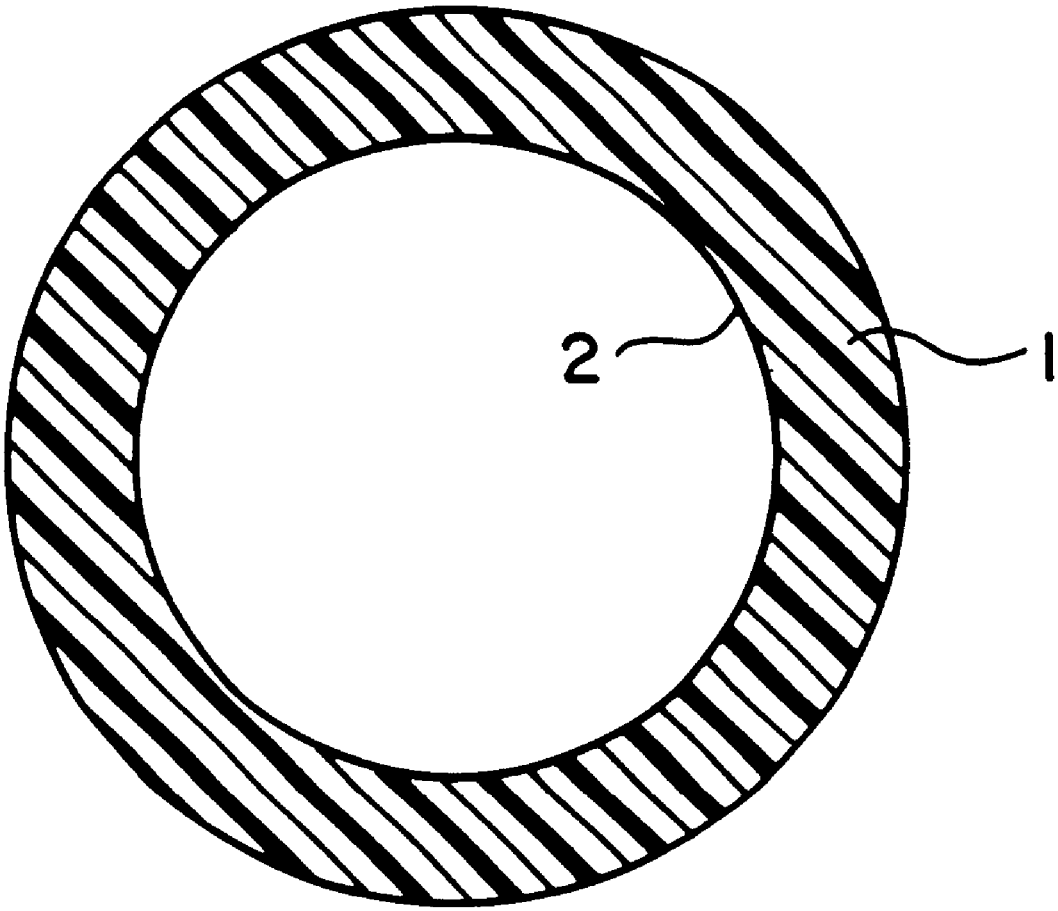
FIG. 1 is a transverse cross-section, not to scale, of the shock wave conductor of the invention.

The position and functioning of sizing die or plate 13 is in many instances critical to the geometry and, hence, to the performance of the final finished product. The final tubing dimensions may be from 2.5 mm to 3.3 mm outside diameter and about 1.3 mm inside diameter. Plate or die 13 governs the size and shape of the product subsequently produced at stretching station 16. Any fluctuations in the tubing leaving die plate 13 tend to be preserved through the subsequent stretch operation. Die plate 13 may comprise, for example, a metal split ring equipped for water cooling and lubrication, a series of such rings or a vacuum sizing device. The large slow moving primary capstan at station 16 is important both to provide control of the drawdown ratio of the primary tube and to provide sufficient surface area and drag to prevent slippage and/or "free-wheeling" during the stretching operation. The stretch ratio is critical to the achievement of the ultimate tensile strength of the product while maintaining adequate size control and eliminating excessive stretch in the final product. The addition of reactive material to the large tube at station 12 is controlled so that the final tubing core load is in the order of 10–30 mg/m. However circumstances could call for higher loadings as is known in the art in which case appropriate adjustments would be made.

The plastic blend, e.g. 80/10/10, preferably comprises linear low density polyethylene (LLDPE) as the major component and, for example, ethylene vinyl/acetate copolymer (EVA) and ethylene/acrylic acid copolymer as minor components. The LLDPE gives tensile strength to the final product, the EVA provides melt-strength in order to extrude more easily a uniform product and the ethylene acrylic acid copolymer imparts enhanced powder adhesion. It will be recognized by those skilled in the art that a reduced melt drawdown ratio may obviate the need for a melt strength enhancer or may require less of it. Further, the melt-strength requirement and the powder adhesion capability, may, in some instances, be provided by a single resin suitably possessing both attributes e.g. selected EVAs. The addition of the ethylene/acrylic acid copolymer at 10% w/w to the blend gives excellent powder adhesion to the tubing, and levels well in excess of 4.3 g of powder per square meter of inner tube area are readily achievable.

The tensile strength of the shock tube of the invention is high compared with any known prior art shock tube. Tubing of 3.0 mm O.D. and 1.3 mm I.D. requires a load of between 90 kg and 100 kb to break it at about 100% elongation. This translates to a tensile strength of 150 to 170 $N/mm^2$ (20,000 to 25,000 psi). Stress-relieving will reduce tensile strength and increase elongation to break.

It will be understood that, during the manufacturing process, various quality control testing and inspections are performed to ensure that the core load of reactive material is within the specified range and that the dimensions of the tube are uniform and within arrow limits.

The invention will now be further described by way of the following non-limitative Examples. Example 1 is a comparative Example not in accordance with the invention.

EXAMPLE I

Figure 2:
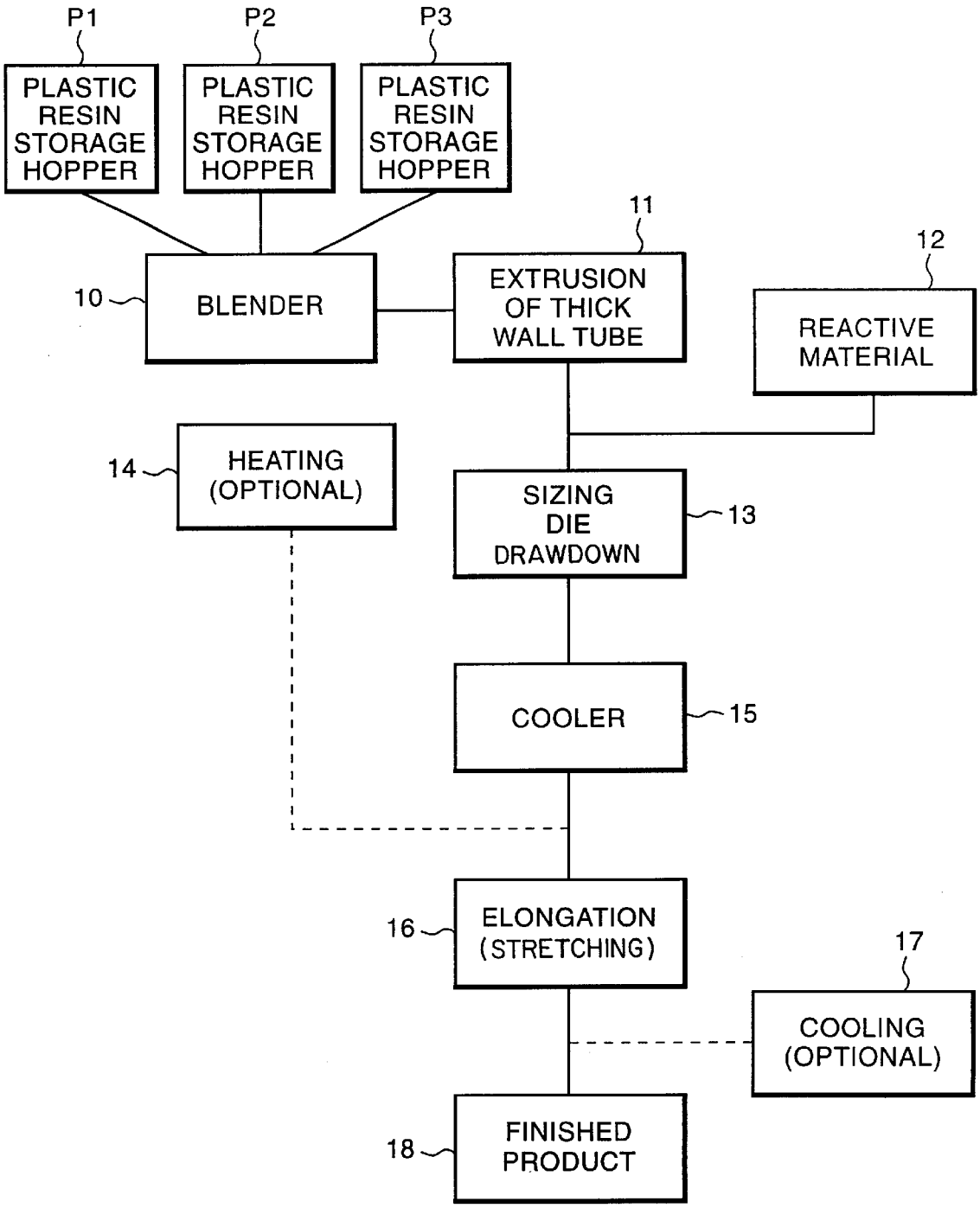
FIG. 2 is a flow diagram illustrating the manufacturing steps employed in the method of the invention.

A blend of LLDPE (85%) and low functionality (2%) EVA (15%) was extruded by a Battenfelder extruder (5.0 cm diameter, 24:1 1/d metering screw), through a 3.0 cm outer die and a 1.4 cm inner mandrel. The melt was subjected to a 15:1 drawdown over 25 cm through a 7.6 mm diameter sizing die and processed as shown in FIG. 2. The optional heating and cooling were not used. The large tube dimensions were about 7.6 mm O.D. extruded at a rate of about 5 m per minute.

After stretching, the tube size was about 3 mm O.D. and produced at a rate of 45 m per minute. Explosive powder (HMX/A1) was added to the large tube at a rate sufficient to give a final core load of about 20 mg/m (4.4 $g/m^2$ of internal area). The tensile strength of this tube was about 140 $N/m^2$. A break load of 80 kg was required at an extension of 160%. Oil resistance was somewhat better than that of regularly produced mono-plastic shock tubing. Powder adhesion was, however, very poor after vibration and handling of the tubing

EXAMPLE II

A blend of LLDPE (80%), EVA (10%) and EAA (10%) was extruded, cooled and stretched as described in Example 1. The tensile strength of this tube was 170 $N/m^2$. A break load of 100 kg was required over an extension of 130%. Oil resistance was unchanged from Example 1. Powder adhesion was over 4.4 $g/m^2$ and approached 7 $g/m^2$.

EXAMPLE III

A portion of the tubing of Example II was stretched by applying the optional heating and cooling stages. No essential differences in tubing properties were observed.

EXAMPLE IV

A blend of LLDPE (67%), EVA (16.5%) and EAA (16.5%) was extruded under the same conditions as Example I. All physical properties were maintained except elongation which was about 100%.

EXAMPLE V

A blend of 80% Dowellex 2045-A, MFI 1.0, density 0.920 g/cc, (an octene-based LLDPE); 10% CIL-605-V, MFI 0.15, density 0.923 g/cc (an EVA copolymer containing 2% VA); and 10% Dow Primacor 1430, MFI 5.0, density 0.938 g/co, (EAA copolymer containing 9% acrylic acid), i.e. and 80/10/10 blend of LLPDE/EVA/EAA, produced a very useful plastics composition which was extruded into tubing. Likewise 90/8/2, 90/10/0, 90/0/10 (no sizing dies), 66/17/17 and 85/15/10 compositions were produced and formed into tubes. The extrusion temperature profile ranged from about 150° C. to 190° C. Melt draw down ratios were 14:1 or less. An extrusion die of approximately 30 mm with a mandrel die of about 14 mm was used. Appropriate sizing dies improved uniformity of tube size. The average coreload of reactive material was about 22 $mg.m^{-1}$. The extruded tube was cold-drawn using a second capstan rotating at around 5–6 times the surface speed of the feed capstan such that the localised draw point or neck was at the point of departure from the feed capstan. Terminal line speed was 40–45 m/min. The true cold draw ratio of the tube was about 4 (weight ratio of equal lengths of undrawn and drawn tube).

Tubing according to the invention (80/10/10) was subjected to various tests to determine its capability in the field. Properties of This single-wall (S/W) composition, O.D. 3.4 mm, I.D. 1.32 mm, are given in Table I below and compared with the currently commercially available over-extruded NONEL tube (O/E). The tests included oil immersion, hoop strength, sunshine exposure, shrinkage and propagation under crimp, powder migration and pull out tests.

TABLE I

| Property | O/E NONEL | S/W |
|---|---|---|
| Oil Resistance | 15–23 days | 15 days |
| Hoop Strength (psi) (Radial Burst) | | |
| 25° C. | 1400 | 1500 |
| 40° C. | 1100 | 1250 |
| 65° C. | 500 | 925 |
| Sunshine Exposure for two days (32° C.) then fired:- burst/100 meters | 42 | 7 |
| Crimp Shrinkage 80° C. for 1 hour | | |
| Linear (%) | 8.5 | 1–3 |
| Crimp 5.4 mm | 0.8 to 0.5 mm | 0.9 to 0.8 mm |
| Firings after 85° C. for 2 hours | 5/5 fail | 0/5 fail |

TABLE I-continued

| | | |
|---|---|---|
| Abrasion | 30 turns | 71 turns |
| Notch test | 7 kg at 60% | 17 kg at 230% |
| Powder Migration | 5% from 18 mg/m | 5% from 18 mg/m |
| Pull through 5.4 mm detonator crimp (load, elongation) | 9.2 kg at 340% | 14.7 at 66% |

EXAMPLE VI

Two compositions were made as before using Dowellex 2045A LLDPE and Primacor EAA, one containing EVA (80/10/10) and one without (43/0/10). The former was extruded at a high temperature profile (greater than 190° C.) whilst the latter was extruded at a lower temperature profile (less than 190° C.) at a draw down ratio of 6:1 to give tubing having the properties indicated in Table II.

TABLE II

| | | |
|---|---|---|
| Composition | 80/10/10 | 90/0/10 |
| Tube Size: O.D. | 3.00 to 3.07 mm | 3.00 to 3.07 mm |
| L.D. | 1.37 mm | 1.35 mm |
| Plastic Weight | 5.26 g/m | 5.26 g/m |
| Coreload | 18.2 mg/m | 18.7 mg/m |
| Powder Migration | 5.4% | 6.9% |
| Hoop Strength | 1620 psi | 1540 psi |
| Abrasion Resistance | 60 turns | 60 turns |
| Shrinkage: 1 hr 80° C. | 3.5% | 3.3% |
| Tensile Strength: | | |
| Breakload | 33.8 kg | 34.9 kg |
| Elongation | 380% | 390% |
| Perforations/100 m Black background, 3.5 hr, air temp. 32° C., bright sunshine | 295* | 154* |

*NB: Commercially available NONEL yields 470 holes under the same conditions

Thus, it is apparent that a melt strength additive (EVA) may be disposed with by appropriate control of the extrusion conditions.

The effect of varying melt conditions while retaining the presence of EVA (CIL 605-V) in a similar 80/10/10 blend (2045-A/605-V/1430), drawn down at 14:1, with a terminal line speed of 40–45 m/min was investigated and the results are shown in the following Table III.

TABLE III

| Sample | 1 | 2 | 3 | 4 |
|---|---|---|---|---|
| Melt Temp (° C.) | 190 | 177 | 168 | 160 |
| Coreload (mg/m) | 18 | 19.6 | 19 | 20.6 |
| Powder Migration (%) | 3 | 3.2 | 3.1 | 1.1 |
| Shrinkage 1 hr 80° C. (%) | 3 | 3.5 | 3.4 | 3.6 |
| Hoop Strength (psi) | 1550 | 1400 | 1475 | 1475 |
| Breakload (kg) | 35 | 31 | 30 | 31 |
| Elongation (%) | 460 | 490 | 460 | 460 |
| Tensile Strength ($N/mm^2$) | 63 | 52 | 34 | 53 |
| Diameter Control | Good | Poor | Poor | Poor |

In the following Examples listed in Table IV a variety of compositions of this invention based mostly on olefinic polymers (matrix) are described and these are respectively: Example VII Dowellex 2045-A; Example VIII Esso 3121.73; Example IX Dow ULDPE-4001; Example X Aecithene LF 3020P; Example XI Dow 2049 LLDPE; Example XII Dow 2075 LLDPE; Example XIII Du Pont 12J1, (all 80%), Example XIV Dowellex 2045-A (90%). Examples VII-XIV contain Primacot 1430 (EAA) (10%) as reactive material adhesion enhancer and all but XIV contain CIL 605-V (EVA) (10%) as melt strength enhancer. Example XV used CIL 605-V as matrix polymer (90%) with Primacor 1430 (10%) as adhesion promoter whilst XVI uses Du Pont 29-08 HDPE (50%), CIL 605-V (40%) and Primacor 1430 (10%). All these compositions were made at a melt draw down ratio of 8:1 and from this Table it can be recognised that a variety of polymers hitherto thought to be unsuitable for use in shock wave conductors can be made to work as blends.

TABLE IV

| Example | VII | VIII | IX | X | XI |
|---|---|---|---|---|---|
| Tube Size: | | | | | |
| O.D. (mm) | 3 | 3 | 3.1 | 3.1 | 2.8 |
| I.D. (mm) | 1.3 | 1.4 | 1.4 | 1.4 | 1.2 |
| Strength (psi) | | | | | |
| Hoop | 1550 | 1310 | 1200 | 1350 | 1745 |
| Abrasion Resistance (turns) | 42 | 46 | 28 | 43 | 50 |
| Shrinkage 1 hr 80° C. (%) | 2.7 | 2.3 | 5.1 | 4.1 | 2.2 |
| Tensile Strength (N/mm$^2$) | 63 | 64 | 44 | 53 | 74 |
| Breakload (kg) | 35 | 35 | 27 | 32 | 36 |
| Elongation (%) | 460 | 500 | 500 | 590 | 370 |

| Example | XII | XIII | XIV | XV | XVI |
|---|---|---|---|---|---|
| Tube Size: | | | | | |
| O.D. (mm) | 3 | 2.8 | 2.9 | 3.1 | N/A |
| I.D. (mm) | 1.3 | 1.3 | 1.2 | 1.4 | N/A |
| Hoop Strength (psi) | 1560 | 1560 | 1550 | 180 | N/A |
| Abrasion Resistance (turns) | 40 | 46 | 47 | 31 | N/A |
| Shrinkage 1 hr 80° C. (%) | 3.4 | 2.6 | 3.6 | 4.6 | N/A |
| Tensile Strength (N/mm$^2$) | 61 | 67 | 64 | 47 | N/A |
| Breakload (kg) | 34 | 33 | 34 | 28 | N/A |
| Elongation (%) | 440 | 420 | 450 | 280 | N/A |

N/A = data not available

Further tests were carried out using Aecithene LLDPE's, LF3020, MFI 1.0, density 918; LC3081, MFI 0.6, density 920; and LF3100 MFI 0.5, density 918, in comparison with the Dowellex 2045-A mentioned above and the results are indicated in the following Table V. The extrusion was run at 65 rpm and the line speed was 13.2 m/min. The temperature of extrusion was changed from high profile melt temperature i.e. about 210° C. to low profile melt temperature i.e about 190° C. As in previous examples blend composition is indicated as % matrix polymer/% melt strength enhancer (605-V)/% adhesion enhancer (1430) i.e. in these examples 80/10/10 shown as A or 90/0/10 as B. The melt draw down ratio was either 6:1 or 17:1 as indicated.

TABLE V

| Example | XVII | XVIII | IXX | XX | XXI |
|---|---|---|---|---|---|
| Matrix | 2045-A | 2045-A | 3020 | 3020 | 3020 |
| Blend | A | B | A | B | A |
| Profile | High | Low | Low | Low | High |
| ddr | 6:1 | 6:1 | 6:1 | 6:1 | 6:1 |
| Tube Size: | | | | | |
| O.D. (mm) | 3 | 3 | 3 | 3 | 3 |
| I.D. (mm) | 1.3 | 1.3 | 1.3 | 1.4 | 1.3 |
| Plastic (g/m) | 5.26 | 5.26 | 5.2 | 5.3 | 5.2 |

TABLE V-continued

| | | | | | |
|---|---|---|---|---|---|
| Coreload (mg/m) | 18.2 | 18.7 | 17.8 | 13.6 | None |
| Migration (%) | 5.4 | 6.9 | 7.5 | 0 | — |
| Hoop Strength (psi) | 1620 | 1540 | 1500 | 1420 | 1485 |
| Abrasion Resistance (turns) | 60 | 60 | 53 | 62 | 56 |
| Shrinkage 1 hr 80° C. (%) | 3.5 | 3.3 | 5.5 | 5.8 | 5.8 |
| Tensile Breakload (kg) | 33.8 | 34.9 | N/A | 36.1 | 34.7 |
| Elongation (%) | 380 | 390 | N/A | 560 | 580 |

| Example | XXII | XXIII | XXIV | XXV |
|---|---|---|---|---|
| Matrix | 3081 | 3100 | 3020 | 3100 |
| Blend | A | A | B | B |
| Profile | Low | High | High | High |
| ddr | 6:1 | 6:1 | 17:1 | 17:1 |
| Tube Size: | | | | |
| O.D. (mm) | 3 | 3 | 3 | 3 |
| I.D. (mm) | 1.3 | 1.4 | 1.3 | 1.3 |
| Plastic (g/m) | 4.8 | 5.7 | 5.3 | 5.3 |
| Coreload (mg/m) | None | None | 15.2 | 16.6 |
| Migration (%) | — | — | 2.75 | 2.6 |
| Hoop Strength (psi) | 1390 | 1400 | 1490 | 1405 |
| Abrasion Resistance (turns) | 32 | 59 | 62 | 63 |
| Shrinkage 1 hr 80° C. (%) | 4.6 | 5.1 | 5.2 | 5.86 |
| Tensile Breakload (kg) | 33.1 | 34.1 | 32.2 | 28.5 |
| Elongation | 295 | 570 | 641 | 500 |

In the following Table VI the physical properties of additional examples of shock wave conductors made in accordance with the present invention are described. The compositions were all based on 80% Dowellex LLDPE 2045-A and 10% CI L EVA 605-V with 10% of a reactive particle adherence promoting material selected from commercially available ionomer resins, i.e. neutralised ethylene/methacrylic acid (Surlyn or Nucrel) or ethylene/acrylic acid (Primacor) resins.

TABLE VI

| Example | XXVI | XXVII | XXVIII | IXXX |
|---|---|---|---|---|
| Components (%): | | | | |
| LLDPE 2045-A | 80 | 80 | 80 | 80 |
| EVA CIL 605-V | 10 | 10 | 10 | 10 |
| Surlyn 1855 | 10 | — | — | — |
| Nucrel 403 | — | — | — | 10 |
| Nucrel 410 | — | — | 10 | — |
| Primacor | — | 10 | — | — |
| Tube Size: | | | | |
| O.D. (mm) | 3.1 | 3.0 | 3.1 | 3.0 |
| I.D. (mm) | 1.4 | 1.3 | 1.4 | 1.3 |
| Plastic (g/m) | 5.5 | 5.2 | 5.3 | 5.2 |
| Coreload (mg/m) | 18.9 | 17.9 | 18.6 | 16.9 |
| Migration (%) | 4.5 | 9.3 | 12.8 | 1.6 |
| Shrinkage 1 hr 80° C. (%) | 2.2 | 2.6 | 2.3 | 2.3 |
| Tensile Strength (N/mm$^2$) | 43 | 48 | 48 | 51 |
| Breakload (kg) | 26.8 | 27.2 | 29.3 | 29.2 |
| Elongation (%) | 690 | 520 | 520 | 510 |

The above results are quite favourable and in particular the results of Example IXXX show Nucrel 403 (EMA) to be especially good in minimising powder migration.

Further work was carried out using different matrix polymers in place of the LLDPEs illustrated in the foregoing Examples with EVAs and EAAs as referred to above. Satisfactory tubes were drawn at elevated temperatures using polypropylene based (80/10/10) compositions. Similar results were obtained using polyester based (90/10 and 80/10/10) compositions.

EXAMPLE XXX

A polypropylene based tube composed of 80% rubber toughened polypropylene (90% SHELL GET6100N polypropylene with 10% EXXELOR PE 808 ethylene/propylene copolymer) 10% EVA and 10% EAA (PRIMACOR) was extruded and cold drawn at a temperature of 150° C. (achieved in a fluidised bed of glass spheres). The primary tube had an external initial diameter of 6.3 mm and the drawn tube, at the localised draw point, had an external final diameter of 2.7 mm. The tube quality was good and powder adhesion was satisfactory.

A laboratory powder adhesion test using an LLDPE matrix polymer with a standardized reactive material was used to evaluate a variety of powder adhesion enhancing materials and the results are reported in Table VII below

TABLE VII

| Powder adhesion enhancing material | (%) | Coverage (g/m$^2$) |
|---|---|---|
| EAA (Primacor) | 10 | 3.5–4 |
| Polyisobutylene (Hyvis 30) | 1 | 2 |
| Polyisobutylene (Hyvis 30) | 2 | 3.5 |
| Polyisobutylene (Hyvis 30) | 5 | 9–9.5 |
| Polybutadiene (Lithene N4 6000) | 3 | 5 |
| Polyethylene Wax (AC617A) | 5 | 2 |
| Polyethylene Wax (AC617A) | 10 | 3 |
| EVAL (SOARNOL D) | 2 | 2 |
| EVAL (SOARNOL D) | 5 | 5.9 |
| Portugese WW Gum Rosin | 1 | 2.5–3 |

In the following Examples higher functionality (9% VA) EVA obtainable under the trade mark EVATANE was substituted for the EVA (lower VA) used in earlier Examples with a view to determining the effect on surface coverage after loading with a standardized powder. The results are indicated in Table VIII below and it can be seen that compositions B containing slightly higher functionality EVA than those of compositions A leads to improved surface coverage but it should be appreciated that significantly higher VA functionality levels could require adjustment of the extrusion conditions. However it is interesting to note that use of increased quantities of EVATANE does not have any marked effect on surface coverage. This also shows that certain EVAs can function as adhesion promoters in the bulk polymer matrix.

TABLE VIII

| POLYMER BLEND COMPOSITION % | SURFACE COVERAGE g.m$^{-2}$ |
|---|---|
| LLDPE: Lower VA EVA | |
| A1 90:10 | 1.88 |
| A2 90:10 | 1.09 |
| A3 90:10 | 1.09 |
| LLDPE: Higher VA EVA | |
| B1 90:10 | 2.31 |
| B2 30:20 | 2.33 |
| B3 60:40 | 2.74 |

We claim:

1. A cold drawn low energy shock wave conductor comprising an extruded single-wall, dimensionally stable plastic tube having an inner surface coated with a particulate reactive energetic material, the plastic of the tube comprising a *substantially* homogeneous [extrudable] blend of a major amount of a draw [orientable] *oriented* polymer resin lacking adequate reactive material-retaining properties, and a minor amount of a modifier which is a miscible or compatible material which imparts an enhanced reactive material-retaining capability to the inner surface of said extruded plastic tube.

2. A shock wave conductor according to claim 1 wherein said polymer resin is in the form of a continuous matrix and the modifier is distributed in the matrix polymer such that it has a greater concentration at said inner surface of the tube than in the body of the matrix.

3. A shock wave conductor according to claim 2 wherein said modifier is present as non-contiguous particles or fibrils within the matrix.

4. A shock wave conductor according to claim 3 wherein said particles are about 0.5[μin] *μ in* size.

5. A shock wave conductor according to claim 2 wherein said modifier is concentrated in segregated zones in the matrix.

6. A shock wave conductor according to claim 1 wherein the polymer resin is a fibre forming [a] polymer.

7. A shock wave conductor according to claim 1 wherein the polymer resin is selected from the group consisting of (1) addition polymers and condensation polymers having a substantially linear hydrocarbon backbone structure; (2) such polymers wherein the backbone structure is interrupted by hetero atoms; (3) such polymers wherein the backbone structure is substituted by polar functional groups; and *(4)* such polymers wherein the backbone structure is interrupted by hetero atoms and substituted *by* polar functional groups.

8. A shock wave conductor according to claim 7 wherein the addition polymer is selected from the group consisting of a polyolefin homopolymer and *a* polyolefin copolymer.

9. A shock wave conductor according to claim 7 or 8 wherein the addition polymer is selected from the group consisting of a copolymer of ethylene and a copolymer of an alpha-olefin with a substituted olefin monomer.

10. A shock wave conductor according to claim 7 wherein the condensation polymer is selected from the group consisting of a polyester and a polyamide.

11. A shock wave conductor according to claim 1 wherein said modifier is selected from the group consisting of a homo-polymer, a copolymer resin, and a material of lower molecular weight than the homopolymer and copolymer resin but of like properties.

12. A shock wave conductor according to claim 11 wherein the modifier is selected from the group consisting of ionomers, ethylene/acrylic acid (EAA) copolymers, ethylene/methacrylic acid (EMA) copolymers, polyisobutylenes (PIB), polybutadienes (PBD), polyethylene waxes (PE Wax), polyethylene glycols (PEG), poly-propylene glycols (PPG), ethylene vinyl alcohol resins (EVAL), butyl rubber, Rosin, maleinised polypropylene, polyacrylamide or polyacrylamide oxime resins, polyethylene imine, sulphone and phosphonate resins.

13. A shock wave conductor according to claim 11 wherein the modifier is selected from the group consisting of ethylene/acrylic acid (EAA) copolymers, ethylene/methyacrylic acid (EMA) copolymers and neutralised ionomers thereof.

14. A shock wave conductor according to claim 11 wherein the modifier is selected from the group consisting of polyisobutylenes (PIB), polybutadienes (PBD), polyethylene waxes (PE Wax), polyethylene glycols (PEG), polypropylene glycols (PPG), ethylene vinyl alcohol resins (EVAL), butyl rubber, Rosin, maleinised polypropylene, polyacrylamide, poly-acrylamide oxime resins, polyethylene imine, sulphone and phosphonate resins.

15. A shock wave conductor according to claim 11 wherein the modifier is selected from the group consisting of ethylene/acrylic acid (EAA) copolymers, ethylene/methacrylic acids (EMA) copolymers and partially and wholly neutralized monomers thereof.

16. A shock wave conductor according to claim 1 comprising a minor amount of a homopolymer or copolymer resin or cross-linking agent which is miscible in or compatible with said [orientable] polymer resin and which imparts melt strength and aids in tube extrusion.

17. A shock wave conductor according to claim 16 wherein the melt strength/extrusion improving resin is selected from the group consisting of ethylene/vinyl acetate copolymers and copolymers of ethylene with lower alkyl esters of acrylic or methacrylic acid.

18. A shock wave tube according to claim 1 having a tensile strength of up to 170 newtons per square millimeter.

19. A shock wave conductor according to claim 1 wherein the coreload is from about 15 to 60 $mg.m^{-1}$.

20. A shock wave conductor according to claim 1 wherein the coreload is up to about 20 $mg.m^{-1}$.

21. A shock wave conductor according to claim 1 wherein the tube has dimensions of from 2.5 to 3.3 mm O.D. and about 1.3 mm I.D.

22. A shock wave conductor according to claim 1 wherein the tube is treated externally with agents to improve resistance to water or oil or to water and oil.

23. A shock wave conductor according to claim 1 wherein the polymer resin is a condensation polymer having a substantially linear hydrocarbon backbone structure interrupted by hetero atoms.

24. A shock wave conductor according to claim [9] *7* or claim 23 wherein the polymer resin has a substantially linear hydrocarbon backbone structure substituted by polar functional groups.

25. A low energy shock wave conductor in the form of a cold drawn extruded single wall, dimensionally stable plastic tube having an inner surface coated with particulate reactive energetic material formed according to the method which comprises (a) extruding a polymeric melt through a wide annular die in the form of a thick walled tube while distributing particulate reactive energetic material in a core load per unit of length on the inner surface of the thick walled tube, the polymeric melt comprising a substantially homogenous blend of a major amount of a draw orientable melt-extrudable polymer resin and a minor amount of a miscible or compatible material as an adhesion promoting agent which is distributed in the extruded melt such that it has a greater concentration at the inner surface of the tube than in the body of the extruded melt and imparts an enhanced reactive energetic material-retaining capability to the inner surface of the extruded tube, and (b) cold drawing the thick walled tube to elongate and form a localized drawing point to increase tube tensile strength, reduce wall thickness, and to reduce core load per unit length of the reactive energetic material.

26. A low energy shock wave conductor according to claim 25 in the form of a cold drawn extruded single wall, dimensionally stable plastic tube having an inner surface coated with a particulate reactive energetic material wherein the polymer melt further comprises a minor amount of a homopolymer or copolymer resin which is miscible in the polymer melt and which imparts melt strength and aids in tube extrusion.

27. A low energy shock wave conductor comprising a cold drawn, dimensionally stable *extruded* tube made of [extrudable] *a* plastics material, and containing a core loading of a particulate reactive energetic material, wherein the said tube has an extruded single-wall, and throughout its length an inner surface circumscribing a void through which a shock wave may be transmitted, the said surface retaining said particulate reactive energetic material as a layer thereon, and the said plastics material comprises a substantially homogeneous blend of a major amount of a draw [orientable] *oriented* polymer resin lacking adequate reactive material-retaining properties, and a minor amount of a modifier which is a miscible or compatible material which imparts an enhanced reactive material-retaining capability to said polymer resin.

28. A low energy shock wave conductor comprising an extruded single-wall, dimensionally stable plastic tube having an inner surface coated with a particulate reactive energetic material, the plastic of the tube comprising a *substantially* homogeneous [extrudable] blend of a major amount of a draw [orientable] *oriented* polymer resin lacking adequate reactive material-retaining properties, and a minor amount of a modifier which is a miscible or compatible material which imparts an enhanced reactive material-retaining capability to the inner surface of said extruded plastic tube wherein the polymer resin is a continuous matrix and the modifier is present as fibrils a few microns in length with aspect ratios of from about 6 to about 10 aligned with the tube axis and distributed in the matrix polymer such that it has a greater concentration at the inner surface of the tube than in the body of the matrix.

29. A cold drawn shock wave conductor according to claim 28.

*30. A low energy shock wave conductor comprising a cold drawn plastic tube having a longitudinal axis and an inner surface which circumscribes a void, said inner surface being coated with a reactive material which upon ignition produces a shock wave which is transmitted along the tube within the void, said tube comprising:*

(*a*) *a first polymer which:*

(*i*) has a chemical composition which:

(*a*) *causes the first polymer to exhibit an increase in tensile strength per unit area when draw oriented, and*

(*b*) *lacks adequate reactive material-retaining properties; and*

(*ii*) *has been draw oriented by being cold drawn in the direction of said longitudinal axis; and*

(*b*) *a second polymer which:*

(*i*) *has a chemical composition which causes the second polymer to exhibit enhanced reactive material-retaining capability compared to the first polymer; and*

(*ii*) *is located at at least said inner surface.*

*31. The low energy shock wave conductor of claim 30 wherein the first polymer has been draw oriented at a draw ratio of at least 4:1, weight for weight for equal lengths of undrawn and drawn polymer.*

*32. The low energy shock wave conductor of claim 30 wherein the first polymer comprises a linear polyethylene.*

*33. The low energy shock wave conductor of claim 30 wherein the second polymer comprises an ethylene acrylic acid copolymer.*

*34. The low energy shock wave conductor of claim 30 wherein the second polymer comprises an ethylene/methacrylic acid copolymer.*

*35. The low energy shock wave conductor of claim 34 wherein the ethylene/methacrylic acid copolymer is wholly or partially neutralized.*

*36. The low energy shock wave conductor of claim 30 wherein the second polymer comprises an ionomer.*

*37. The low energy shock wave conductor of claim 30 wherein the inner surface is coated with the reactive material at a core load rate of 10–30 milligrams per meter.*

* * * * *